US012596682B2

(12) United States Patent
Sadavarte et al.

(10) Patent No.: US 12,596,682 B2
(45) Date of Patent: Apr. 7, 2026

(54) SYSTEM AND METHOD FOR OBJECT STORE FEDERATION

(71) Applicant: Nutanix, Inc., San Jose, CA (US)

(72) Inventors: Mayur Vijay Sadavarte, Sunnyvale, CA (US); Anoop Kandi Reddy, San Jose, CA (US); Dheer Moghe, Bangalore (IN); Fnu Sadhana Kannan, Sunnyvale, CA (US); Sarthak Moorjani, Bangalore (IN); Chinmay Dinesh Kamat, San Jose, CA (US); Karan Gupta, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/351,876

(22) Filed: Jul. 13, 2023

(65) Prior Publication Data

US 2024/0086368 A1 Mar. 14, 2024

(30) Foreign Application Priority Data

Sep. 12, 2022 (IN) .............................. 202241052049

(51) Int. Cl.
| | |
|---|---|
| *G06F 16/00* | (2019.01) |
| *G06F 9/54* | (2006.01) |
| *G06F 16/16* | (2019.01) |
| *G06F 16/182* | (2019.01) |

(52) U.S. Cl.
CPC ............ *G06F 16/164* (2019.01); *G06F 9/547* (2013.01); *G06F 16/1844* (2019.01)

(58) Field of Classification Search
CPC .... G06F 16/164; G06F 9/547; G06F 16/1844; G06F 16/27

USPC .................................................. 707/600–899
See application file for complete search history.

(56) References Cited

U.S. PATENT DOCUMENTS

| | | |
|---|---|---|
| 7,653,668 B1 | 1/2010 | Shelat et al. |
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Anhtai V Tran
*Assistant Examiner* — Shirley D Hicks
(74) *Attorney, Agent, or Firm* — Foley & Lardner LLP

(57) ABSTRACT

In some aspects, an apparatus includes a processor and a memory. The memory can include programmed instructions that, when executed by the processor, cause the apparatus to receive a request to create a bucket. The memory can also include programmed instructions that, when executed by the processor, cause the apparatus to, in response to receiving the request to create the bucket, write, to a first object store, a first mapping that maps an identifier of global metadata to an identifier of a second object store where the bucket is to be created, write, to the second object store, a second mapping that maps the identifier of global metadata to local metadata, and replicate, to the second object store, the first mapping.

17 Claims, 10 Drawing Sheets

(56) References Cited

U.S. PATENT DOCUMENTS

| | | | |
|---|---|---|---|
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,772,866 | B1 | 9/2017 | Aron et al. |
| 12,216,549 | B2 | 2/2025 | Yadav et al. |
| 12,321,908 | B2 | 6/2025 | Annamalai et al. |
| 2008/0154987 | A1 | 6/2008 | Kottomtharayil et al. |
| 2016/0292193 | A1 | 10/2016 | Madanapalli et al. |
| 2017/0277872 | A1 | 9/2017 | Mercury et al. |
| 2017/0279614 | A1 | 9/2017 | Mercury et al. |
| 2020/0151114 | A1* | 5/2020 | McHugh ............... G06F 3/0608 |
| 2021/0034760 | A1 | 2/2021 | Banga |
| 2021/0397611 | A1 | 12/2021 | Boutros et al. |
| 2022/0035769 | A1* | 2/2022 | Bao ....................... G06F 16/178 |
| 2022/0138279 | A1 | 5/2022 | Lepeska et al. |
| 2022/0210129 | A1 | 6/2022 | Brett et al. |
| 2022/0269418 | A1* | 8/2022 | Black ...................... G06F 3/064 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Google Cloud. "Bucket locations" Cloud Storage. Dec. 8, 2022. Retrieved from https://cloud.google.com/storage/docs/locations (accessed Oct. 13, 2023).

IBM. "Configuring the initial object store data sources by using the graphical user interface" FileNet P8 Platform. Dec. 16, 2022. Retrieved from https://www.ibm.com/docs/en/filenet-p8-platform/ 5.5.x?topic=ccpeibugui-configuring-initial-object-store-data-sources-by-using-graphical-user-interface (accessed Oct. 13, 2023).

IBM. "Creating the initial object store" FileNet P8 Platform. Dec. 16, 2022. Retrieved from https://www.ibm.com/docs/en/filenet-p8-platform/5.5.x?topic=engine-creating-initial-object-store (accessed Oct. 13, 2023).

IBM. "Federating content" FileNet P8 Platform. Feb. 9, 2023. Retrieved from https://www.ibm.com/docs/en/filenet-p8-platform/ 5.5.x?topic=infrastructure-federating-content (accessed Oct. 13, 2023).

IBM. "Getting started with IBM Cloud Object Storage" Product Guide Object Storage. Jan. 19, 2022. Retrieved from https://cloud. ibm.com/docs/cloud-object-storage?topic=cloud-object-storage-getting-started-cloud-object-storage (accessed Oct. 13, 2023).

IBM. "Request forwarding" FileNet P8 Platform. Feb. 9, 2023. Retrieved from https://www.ibm.com/docs/en/filenet-p8-platform/ 5.5.x?topic=infrastructure-request-forwarding (accessed Oct. 13, 2023).

Oracle. "Configure Object Storage cross-region replication for Disaster Recovery" Help Center. Oct. 12, 2022. Retrieved from https://docs.oracle.com/en/learn/object-replication-for-dr/index. html (accessed Oct. 13, 2023).

Oracle. "Object Storage" Oracle Cloud Infrastructure (OCI). Mar. 8, 2022. Retrieved from https://www.oracle.com/cloud/storage/object-storage/ (accessed Oct. 13, 2023).

Red Hat. "Chapter 3. Configuring Quay before deployment" Red Hat Customer Portal. Mar. 24, 2023. Retrieved from https://access. redhat. com/documentation/en-us/red_hat_quay/3.6/html/deploy_ red_hat_quay_on_openshift_with_the_quay_operator/operator-preconfigure (accessed Oct. 13, 2023).

Red Hat. "Chapter 6. Content distribution with Red Hat Quay" Red Hat Customer Portal. Aug. 18, 2023. Retrieved from https://access. redhat.com/documentation/en-us/red_hat_quay/3.9/html/red_hat_ quay_architecture/content-distrib-intro (accessed Oct. 13, 2023).

Red Hat. "Chapter 9. Federated Object Gateway" Red Hat Customer Portal. Jul. 19, 2019. Retrieved from https://access.redhat. com/documentation/en-us/red_hat_ceph_storage/1.3/html/object_ gateway_guide_for_red_hat_enterprise_linux/federated_object_ gateway (accessed Oct. 13, 2023).

Red Hat. "Manage Red Hat Quay" Red Hat Customer Portal. Jul. 15, 2019. Retrieved from https://access.redhat.com/documentation/ en-us/red_hat_quay/3/html-single/manage_red_hat_quay/index (accessed Oct. 13, 2023).

Red Hat. "Use Red Hat Quay" Red Hat Customer Portal. Jan. 19, 2022. Retrieved from https://access.redhat.com/documentation/en-us/red_hat_quay/3.5/html-single/use_red_hat_quay/index (accessed Oct. 13, 2023).

* cited by examiner

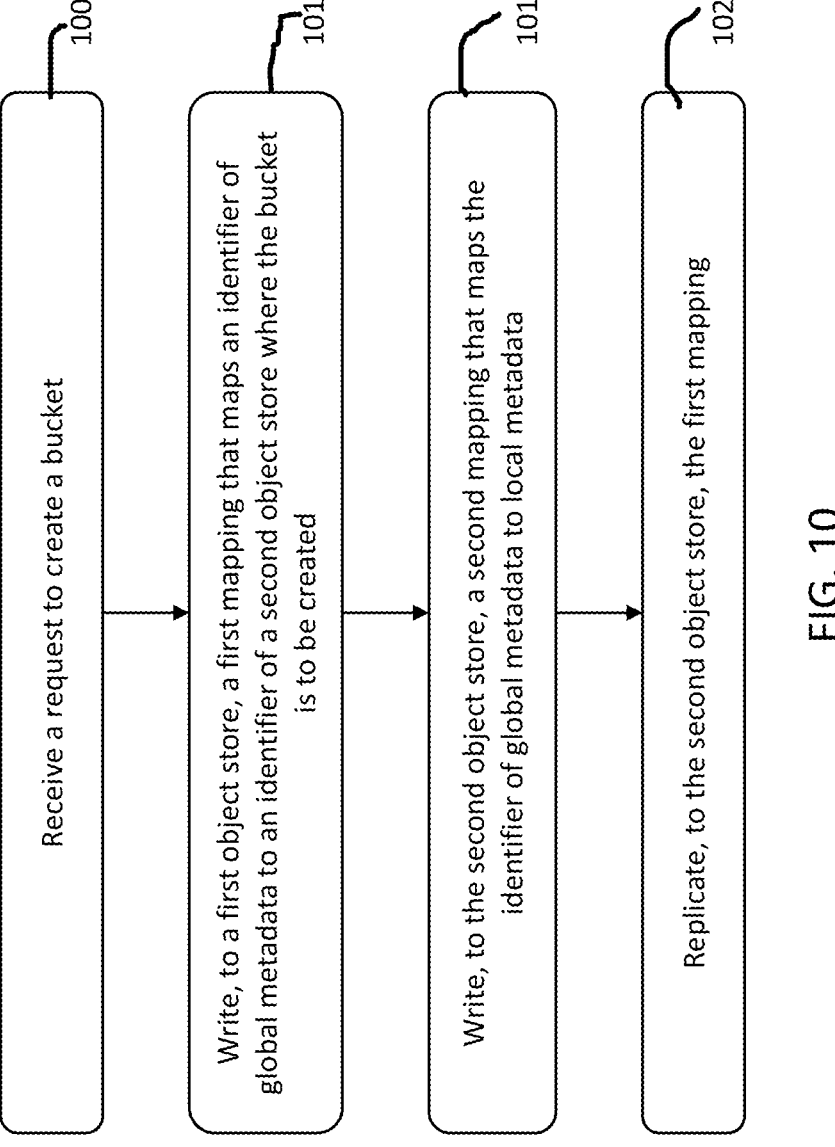

1005

Receive a request to create a bucket

1010

Write, to a first object store, a first mapping that maps an identifier of global metadata to an identifier of a second object store where the bucket is to be created

1015

Write, to the second object store, a second mapping that maps the identifier of global metadata to local metadata

1020

Replicate, to the second object store, the first mapping

SYSTEM AND METHOD FOR OBJECT STORE FEDERATION

CROSS-REFERENCE TO RELATED PATENT APPLICATIONS

This application claims priority from Indian Provisional Patent Application No. 202241052049, filed on Sep. 12, 2022, the entirety of which is incorporated by reference herein.

BACKGROUND

Object storage treats data as discrete units, or objects, that are accompanied by metadata and a universally unique identifier (UUID). This unstructured data resides in a flat (as opposed to tiered) address space called a storage pool.

SUMMARY

Aspects of the present disclosure relate generally to object storage, and more particularly to an object store federation.

In some aspects, an apparatus includes a processor and a memory. In some embodiments, the memory includes programmed instructions that, when executed by the processor, cause the apparatus to receive a request to create a bucket. In some embodiments, the memory includes programmed instructions that, when executed by the processor, cause the apparatus to, in response to receiving the request to create the bucket, write, to a first object store, a first mapping that maps an identifier of global metadata to an identifier of a second object store where the bucket is to be created, write, to the second object store, a second mapping that maps the identifier of global metadata to local metadata, and replicate, to the second object store, the first mapping.

In some aspects, a non-transitory computer readable storage medium includes instructions stored thereon that, when executed by a processor, cause the processor to receive a request to create a bucket. In some embodiments, the medium includes the instructions stored thereon that, when executed by a processor, cause the processor to receive a request to create a bucket in response to receiving the request to create the bucket, write, to a first object store, a first mapping that maps an identifier of global metadata to an identifier of a second object store where the bucket is to be created, write, to the second object store, a second mapping that maps the identifier of global metadata to local metadata, and replicate, to the second object store, the first mapping.

In some aspects, a computer-implemented method by a processor includes receiving a request to create a bucket. In some embodiments, the method includes, in response to receiving the request to create the bucket, writing, to a first object store, a first mapping that maps an identifier of global metadata to an identifier of a second object store where the bucket is to be created, writing, to the second object store, a second mapping that maps the identifier of global metadata to local metadata, and replicating, to the second object store, the first mapping.

Further details of aspects, objects, and advantages of the disclosure are described below in the detailed description, drawings, and claims. Both the foregoing general description and the following detailed description are examples and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 10 is a flow diagram of a method for operating an object store federation, in accordance with some embodiments.

Figure 1:
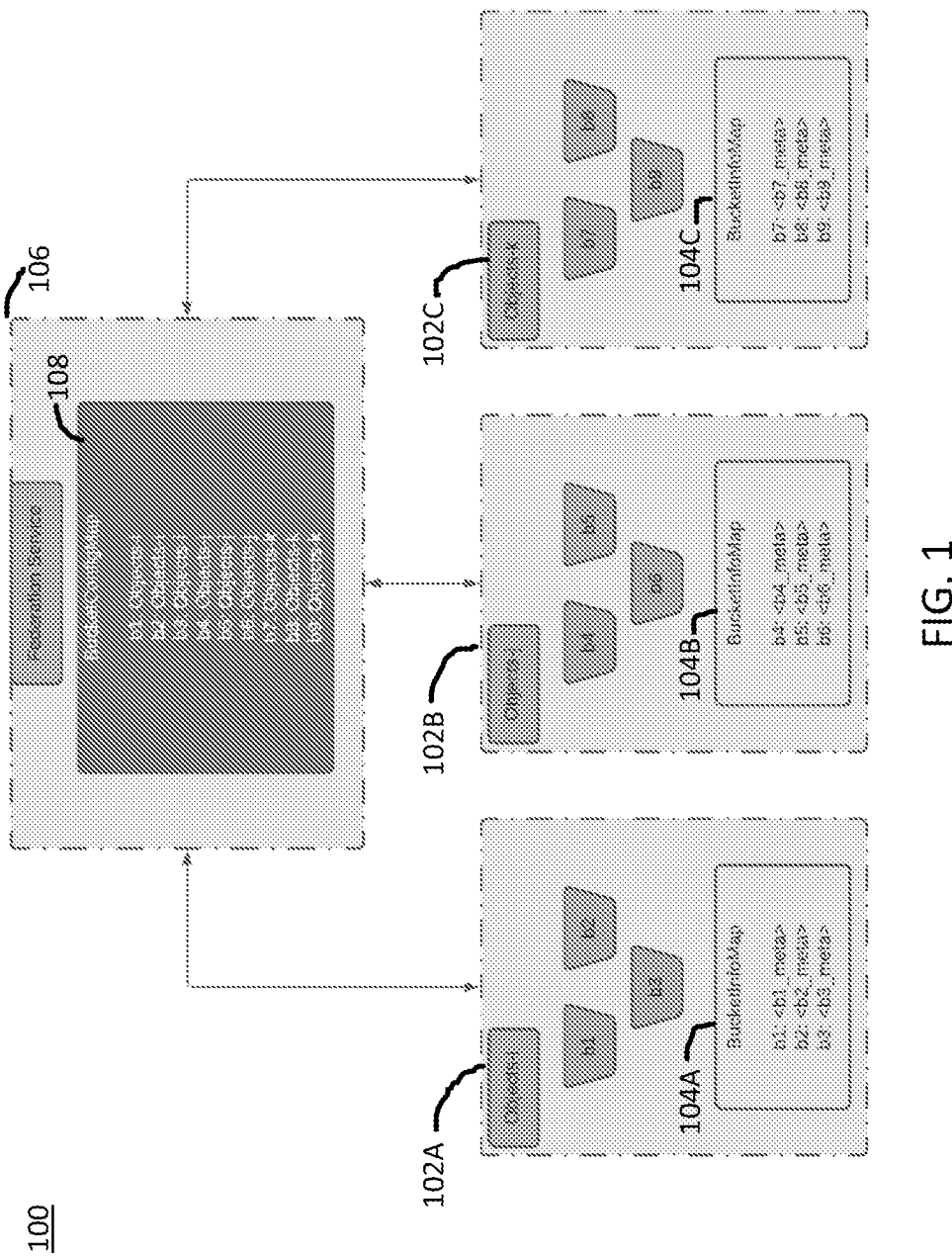
FIG. 1 is a block diagram of an object store federation, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Object stores not including the improvements disclosed herein have no agreement upon standards of operation. Thus, such object stores have drawbacks such as not being able to reduce cross-federation traffic. Such object stores do not have a global namespace, scalability, or high availability. What is needed is a federation of object stores which can provide a scale-out solution for the object stores.

Disclosed herein is a federation architecture for an object store. In the context of a single object store or object store instance, a namespace is a set of unique buckets hosted by that object store instance. The object store federation can create a single uniform namespace across a list of individual object store instances. This single uniform namespace may be a Federation namespace and may allow multiple independent systems to share a common namespace or naming system and to refer to the same resources (e.g., object store instances) using the same names, even if those resources are located in a different systems and locations. Thus, federation provides a way to create a single namespace across multiple individual object store instances. Clients can conduct bucket operations from any single point within a federation. A federation namespace may span across multiple object store instances that potentially reside in different geographical locations. The federation namespace may span across on-premise environments, private cloud, public cloud, or combinations thereof. Thus, the federation architecture allows scalability of object store services (both storage and compute) linearly across data centers, without any artificial limits on the number of instances in the federation. In some embodiments, objects or buckets can be reached with a single hop across a single object store instance. Subsequent accesses can avail cache entries to directly access the final destination of any objects or buckets. Global metadata service can be backed by a distributed consensus protocol to guarantee high availability across individual object store instance failures. The federation namespace may provide a mechanism to create and manage object stores on-premise, public cloud, private cloud, or combinations thereof, including moving objects between on-premises and cloud (whether private or public) and/or between one cloud (e.g., public cloud) and another cloud (e.g., private cloud). The federation namespace may be S3 compliant (e.g., provide an Amazon Web Services Simple Storage Service (AWS S3) compliant interface that uses S3 APIs for communication with the object store instances).

Each object store instance may have a default local namespace that is independent of other object store instance. An object store instance may join multiple federated namespaces by becoming a member of each federation. An object store instance that joins a federation as a member may contribute to the federated namespace. A federated namespace may be accessed from any of the members using the Federation Fully Qualified Domain Name (FQDN) in the Host field of HTTP requests. A federated namespace may enforce unique bucket names within the namespace. For example, if a client creates a bucket "foo" in a federated namespace, then another client that later tries creating the bucket "foo" would fail with error messages such as BucketAlreadyExists or BucketAlreadyOwnedByYou.

All clients, irrespective of which federation member they choose to access the federated namespace from, may see the same consistent list of buckets. Any buckets and objects that are part of the federated namespace may be accessed from any of the members. A federation instance is supported in the backend using a subset of the federation members, called Core Members. Core members, together, run a distributed consensus service in the backend to provide fault tolerance for the federated namespace.

FIG. 1 is a block diagram of an object store federation 100, in accordance with some embodiments. A federation is a group of object store instances that presents (e.g., to a user) a unified object store service, including a global state and application programming interface (API). The object store federation 100 includes a number of object stores 102A, 102B, and 102C, which may be referred to as Objects-i, Objects-j, and Objects-k, respectively. Each of the object stores is a logical or physical construct for storing objects (e.g., immutable data, unstructured data, etc.). Although three object stores are shown, the object store federation 100 may include greater than or fewer than three object stores without departing from the scope of the present disclosure. In some embodiments, each of the object stores are hosted on a different host (e.g., node, host machine, physical host machine, server, server machine, etc.). For example, the object store 102A can be hosted on a first host, the object store 102B can be hosted on a second host, and the object store 102C can be hosted on a third host.

Each of the object stores includes a number of buckets. For example, the object store 102A includes buckets b1, b2, and b3, the object store 102B includes buckets b4, b5, and b6, and the object store 102C includes buckets b7, b8, and b9. Although three buckets are shown in each object store, each object store may include greater than or fewer than three buckets without departing from the scope of the present disclosure. Bucket operations may include, but are not limited to, listing of buckets and objects, viewing and updating bucket, and/or object parameters (versioning, write-once-read-only (WORM), lifecycle, replication, etc.).

Each of the buckets include objects. Objects are discrete units of data that are stored in a structurally flat data environment. There may not be folders, directories, or complex hierarchies as in a file-based system. Each object can be a self-contained repository that includes the data, metadata (descriptive information associated with an object), and a unique identifying ID number (instead of a file name and file path). An object can be immutable data.

Each of the object stores may include one or more namespaces. Namespace may include buckets and then objects within those buckets. Making the namespace global means making the buckets globally visible. Once buckets are globally accessible, bucket metadata can act as a link to make objects within those buckets globally accessible.

In some embodiments, each of the object stores includes a mapping that maps the buckets in the respective object store to the bucket metadata of the respective buckets. For example, the object store 102A includes a mapping 104A, the object store 102B includes a mapping 104B, and the object store 102C includes a mapping 104C. The mapping 104A maps the bucket b1 to the metadata of bucket b1, the bucket b2 to the metadata of bucket b2, and the bucket b3 to the metadata of bucket b3. The mapping 104B maps the bucket b4 to the metadata of bucket b4, the bucket b5 to the metadata of bucket b5, and the bucket b6 to the metadata of bucket b6. The mapping 104C maps the bucket b7 to the metadata of bucket b7, the bucket b8 to the metadata of bucket b8, and the bucket b9 to the metadata of bucket b9. Each of the mappings may be referred to as BucketInfoMap.

The object store federation 100 includes a federation service 106. The federation service 106 manages the global state of the object store federation 100. In some embodiments, the federation service 106 includes a mapping 108 that maps each bucket to an object store that hosts the bucket. For example, the mapping 108 maps the buckets b1, b2, and b3 to the object store 102A, the buckets b4, b5, and b6 to the object store 102B, and the buckets b7, b8, and b9 to the object store 102C. The mapping 108 may be referred to as BucketConfigMap. The individual mappings of the mapping 108 may be referred to as indirection data. In some embodiments, the indirection data may be cached. Although not shown, in some embodiments, the federation service 106 includes a mapping that combines mappings 108, 104A, 104B, and 104C.

Figure 2:
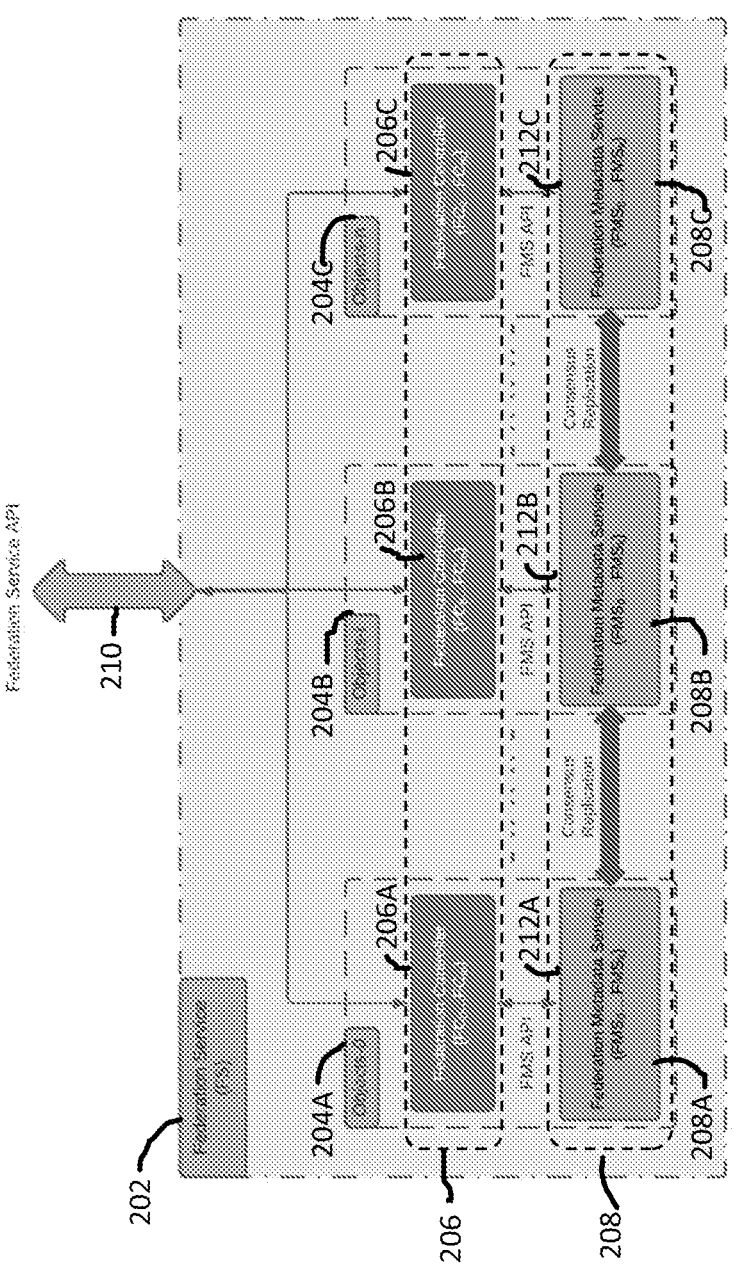
FIG. 2 is a block diagram of an object store federation, in accordance with some embodiments.

FIG. 2 is a block diagram of an object store federation 200, in accordance with some embodiments. The object store federation 200 includes a federation service 202 and object stores 204A, 204B, and 204C. In some embodiments, the object store federation 200 is the object store federation 100, the federation service 202 is the federation service 106, and the object stores 204A, 204B, and 204C, are the object stores 102A, 102B, and 102C.

The federation service 202 includes a federation controller (FC) 206. The federation controller 206 can contain business logic of the FC 206. The FC 206 can expose a federation service API 210 that clients can communicate to. In some embodiments, the FC 206 includes instances that are distributed across some or all the object stores in the object store federation 200. For example, the FC 206 includes an FC instance 206A that is hosted on the object store 204A, an FC instance 206B that is hosted on the object store 204B, and an FC instance 206C that is hosted on the object store 204C.

The federation service 202 includes a federation metadata service (FMS) 208. The FMS 208 can store, or enabling storing of, global metadata. The FMS 208 contains the (e.g., Raft based) consensus service to consistently replicate global metadata. In some embodiments, the FMS 208 includes instances that are distributed across some or all the object stores in the object store federation 200. For example, the FMS 208 includes an FMS instance 208A that is hosted on the object store 204A, an FMS instance 208B that is hosted on the object store 204B, and an FMS instance 208C that is hosted on the object store 204C.

Each FMS instance exposes an FMS API to a respective FC instance. For example, the FMS instance 208A exposes an FMS API 212A to the FC instance 206A, the FMS instance 208B exposes an FMS API 212B to the FC instance 206B, and the FMS instance 208C exposes an FMS API 212C to the FC instance 206C. Each FC instance can use the respective FMS API to store and retrieve global metadata.

Figure 3:
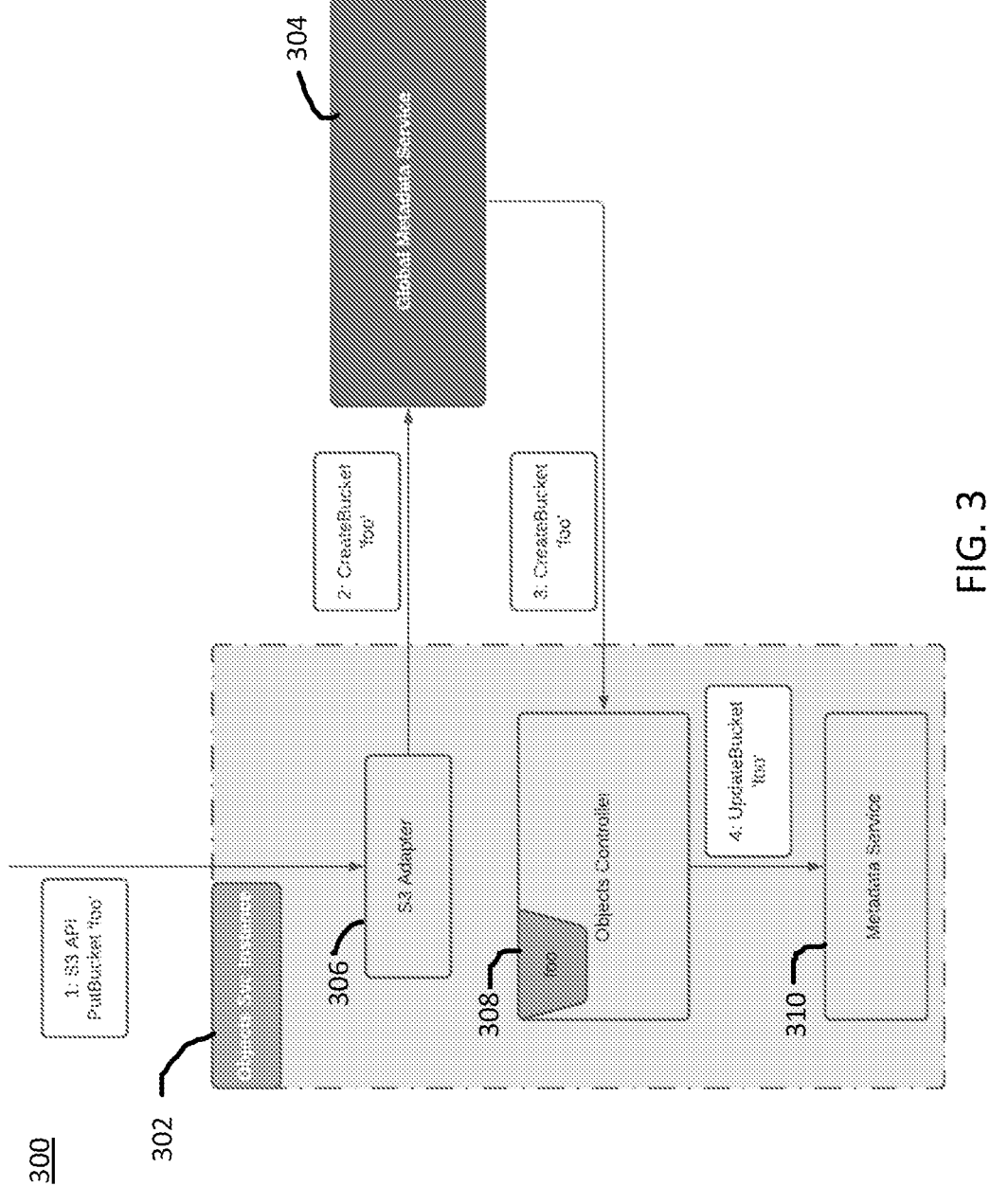
FIG. 3 is a flow block diagram of an object store federation, in accordance with some embodiments.

FIG. 3 is a flow block diagram of an object store federation 300, in accordance with some embodiments. The object store federation 300 includes an object store 302 and a global metadata service (MS) 304. The global MS 304 can be hosted on the object store 302 or external to the object store 302. In some embodiments, the object store federation 300 is the object store federation 200 and/or the object store federation 100, the global MS 304 is the federation service 202 and/or the federation service 106, and the store 302 is one of object stores 204A, 204B, and 204C and/or object stores 102A, 102B, and 102C.

The object store 302 includes an object storage adapter 306 (e.g., an S3 adapter), an object controller 308, and a MS 310. The object storage adapter 306 can expose an API (e.g., an S3 API) for requesting bucket and object operations such as create (e.g., first Put/write), update (e.g., subsequent Put/write), lookup (e.g., Get/read), list, and delete. The object controller 308 can receive requests sent to the object storage adapter 306 and send a metadata request to the metadata service 310 based on the bucket request or object request. The MS 310 can implement the metadata request by storing or retrieving metadata.

In an example workflow, at operation 1, the object storage adapter 306 receives a first request to create a bucket 'foo' (e.g., S3 API PutBucket 'foo') from a client. The client may indicate to create the bucket on a specified object store/ object controller. At operation 2, the object store 302 (e.g., the object storage adapter 306) invokes the federation service API (e.g., the federation service API 210) and sends a second request to create the bucket 'foo' to the global MS 304. The second request may include a hint of the placement of the bucket 'foo' (e.g., based on the first request). In some embodiments, the object storage adapter 306 translates the first request to the second request (e.g., translates a first protocol of the first request to a second protocol of the second request). In some embodiments, the object storage adapter 306 forwards the first request as the second request.

In some embodiments, the global MS 304 creates the global metadata for the bucket 'foo.' For example, it creates an individual mapping that maps the bucket 'foo' to the object store specified in the first request. In some embodiments, the global MS 304 selects the object store the metadata based on the mapping (e.g., based on the hint). Although not shown in FIG. 3, the selected object store may be different from the object store from which the second request originated.

At operation 3, the global MS 304 forwards the second request to the object controller 308. In some embodiments, the global MS 304 sends a third request to the object controller 308 hosted on the selected object store. In some embodiments, the global MS 304 selects the object store based on a global metadata mapping (e.g., the mapping 108). At operation 4, the object controller 308 sends a fourth request to create the local metadata of the bucket 'foo' (e.g., UpdateBucket 'foo') to the MS 310. In some embodiments, creating the local data includes mapping the bucket 'foo' to the local metadata of the bucket 'foo.'

In some embodiments, the bucket listing operation, implemented at the MS 310, can list buckets across all tenants, across all owners within a tenant, or within an owner's namespace. An MS client can execute listing operations across MS instances and compile results to send back to clients. The MS client supports listing fin two modes— paginated and non-paginated. Paginated mode is implemented as shard-based listing, whereas non-paginated mode is implemented as instance-based listing. In some embodiments, bucket list is not supposed to be in any specific order. In shard-based listing MS client can list buckets one shard at a time and keeps track of a continuation token once the page size is exhausted. In instance-based listing, the MS client can spawn listing remote procedure calls (RPCs) to all MS instances in one go and compile the results once all callbacks are done.

Figure 4:
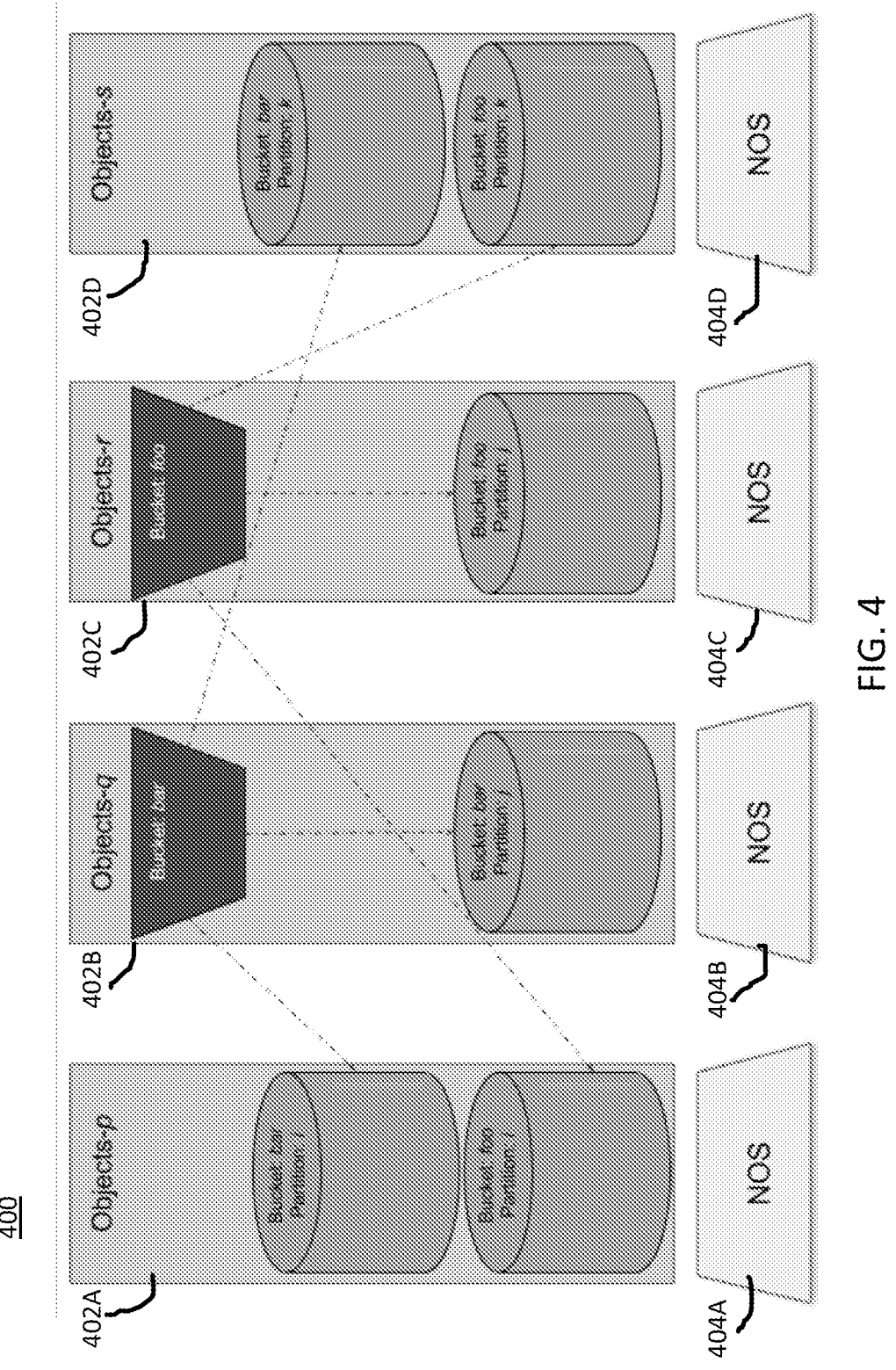
FIG. 4 is a flow block diagram of an object store federation, in accordance with some embodiments.

FIG. 4 is a flow block diagram of an object store federation 400, in accordance with some embodiments. The object store federation 400 includes object stores 402A, 402B, 402C, and 402D. In some embodiments, the object store federation 400 is the object store federation 300, the object store federation 200, and/or the object store federation 100. In some embodiments, the object stores 402A, 402B, 402C, and 402D are four instances of the object store 102A, 204A, and/or 302.

In some embodiments, the object store federation 400 includes a number of base operating systems (NOS) on top of which the respective object stores run. For example, the object store federation 400 includes a NOS 404A on top of which the object store 402A is running, a NOS 404B on top of which the object store 402B is running, a NOS 404C on top of which the object store 402C is running, and a NOS 404D on top of which the object store 402D is running. Each NOS may include a hypervisor or other virtualization interface to physical hardware. The physical hardware may be on the same host or different host.

The object store federation 400 can enable scaling a bucket across multiple object store instances. As shown in FIG. 3, each of the buckets 'foo' and 'bar' have three partitions—'i,' 'j,' and 'k.' The bucket partitions are placed on different object store instances within the object store federation 400. For example, the bucket partition 'bar-i' is placed on the object store 402A, the bucket partition 'bar-j' is placed on the object store 402B, the bucket partition 'bar-k' is placed on the object store 402D, the bucket partition 'foo-i' is placed on the object store 402A, the bucket partition 'foo-j' is placed on the object store 402C, and the bucket partition 'foo-k' is placed on the object store 402D.

Each bucket can be identified with a bucket identifier (ID) such as 'bucket_name' or 'bucket_id' and each partition can be identified with a partition ID such as 'partition_id.' Within a single object store instance, the metadata within a partition can be prefixed with '<bucket_id>:<partition_id>' to provide a unique metadata namespace. There are a couple of approaches to placing bucket partitions across different object store instances within a Federation while making the ID unique. In some embodiments, the global metadata service assigns globally unique IDs for bucket identifiers. In some embodiments, a locally unique ID is assigned during placement or migration of a partition, and the local uniqueness is maintained as more partitions are placed or migrated.

Figure 5:
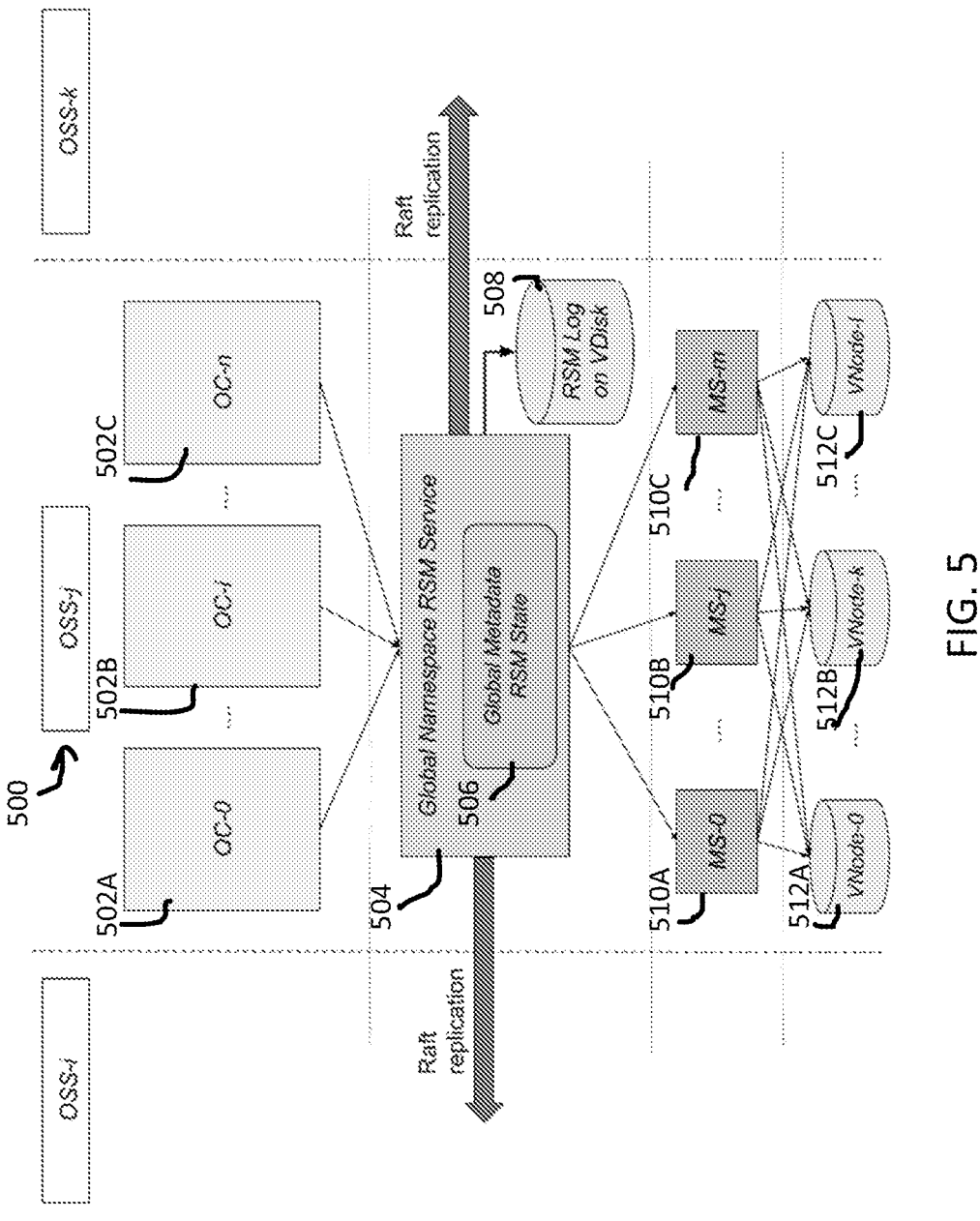
FIG. 5 is a block diagram of an object store, in accordance with some embodiments.

FIG. 5 is a block diagram of an object store 500, in accordance with some embodiments. In some embodiments, object store 500 is an instance of the object store 102A, 204A, and/or 302, or 402A. The object store 500 includes object controllers 502A, 502B, and 502C. In some embodiments, each of the object controllers 502A, 502B, and 502C is an instance of the object controller 308. The object store 500 includes MSs 510A, 510B, and 510C. In some embodiments, each of the MSs 510A, 510B, and 510C is an instance of the MS 310. The object store 500 includes virtual nodes (vnodes) 512A, 512B, an 512C, which are physical or logical constructs that each of the MSs 510A, 510B, and 510C can write metadata to or retrieve metadata from.

The object store 500 is an example architecture for replicating global metadata. The object store 500 includes a global namespace replicated state machine (RSM) service 506. In some embodiments, global namespace RSM service 504 owns and manages a base instance of the global metadata referred to as FederationConfiguration. In some embodiments, global namespace RSM service 504 is the federation service 106, the federation service 202, and/or the global metadata service 304. Global namespace RSM service may be referred to as a global RSM service. The global namespace RSM service 504 includes a global metadata RSM state 506. The global namespace RSM service 504 can replicate the global metadata RSM state 506 to other object stores.

The object store 500 includes a vdisk 508, which can be a persistent storage that can store a log. Every operation that the global metadata receives can get appended to the replicated log and applied to the global metadata state 506. State can be reconstructed, in case of crash failures, by re-applying the log entries during log recovery.

Figure 6:
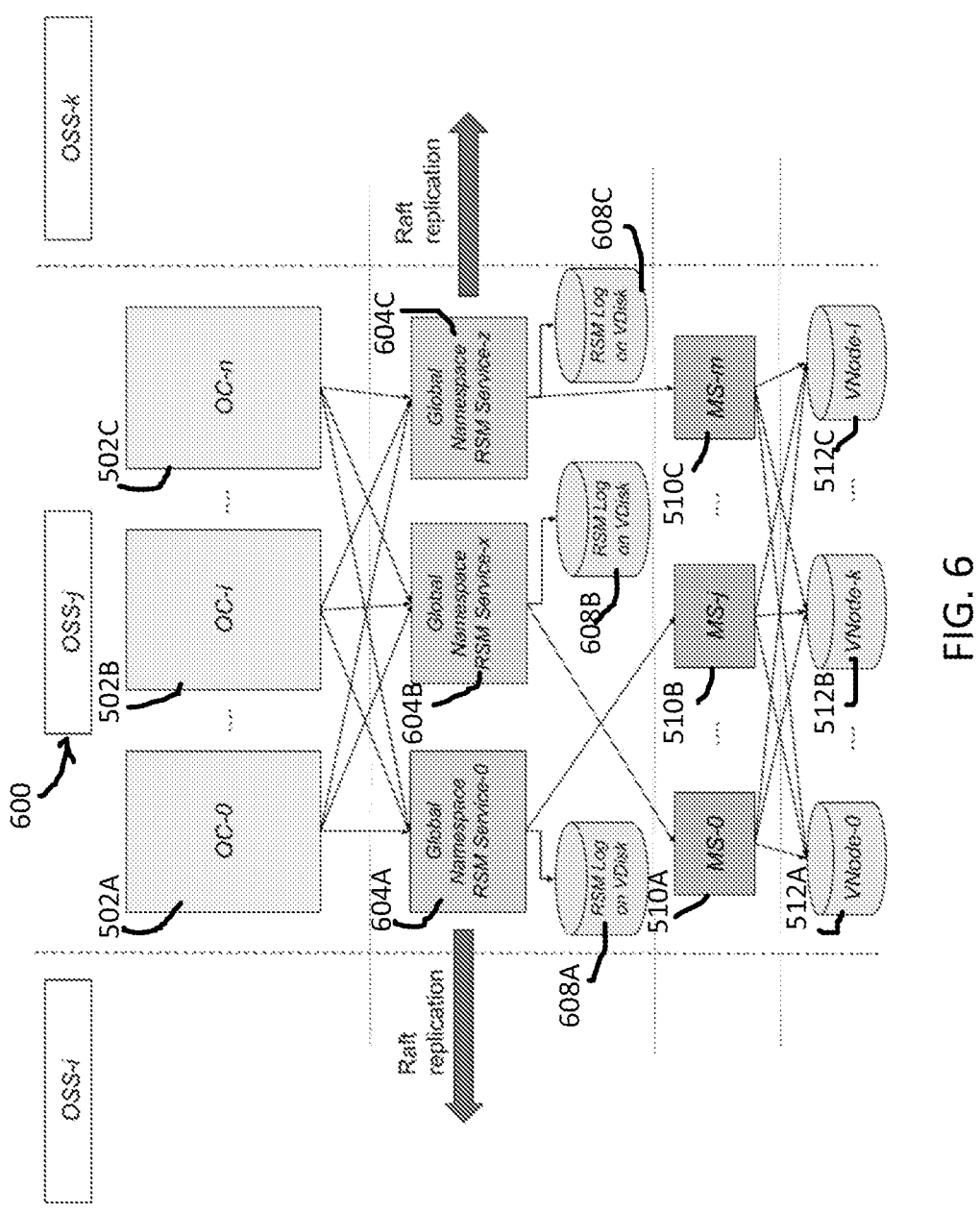
FIG. 6 is a block diagram of an object store, in accordance with some embodiments.

FIG. 6 is a block diagram of an object store 600, in accordance with some embodiments. The object store 600 is an architecture for replicating global metadata, in some embodiments. The object store 600 is similar to the object store 500 except that the object store 600 includes multiple global namespace RSM service instances 604A, 604B, and 604C. A sharding mechanism can be used in order to distribute the storage and compute workload across the multiple global namespace RSM service instances 604A, 604B, and 604C. The state for the RSM can be per-shard global metadata.

Each of the multiple global namespace RSM service instances 604A, 604B, and 604C can be coupled to a separate vdisk. For example, the global namespace RSM service instance 604A is coupled to a vdisk 608A, the global namespace RSM service instance 604B is coupled to a vdisk 608B, and the global namespace RSM service instance 604C is coupled to a vdisk 608C.

Figure 7:
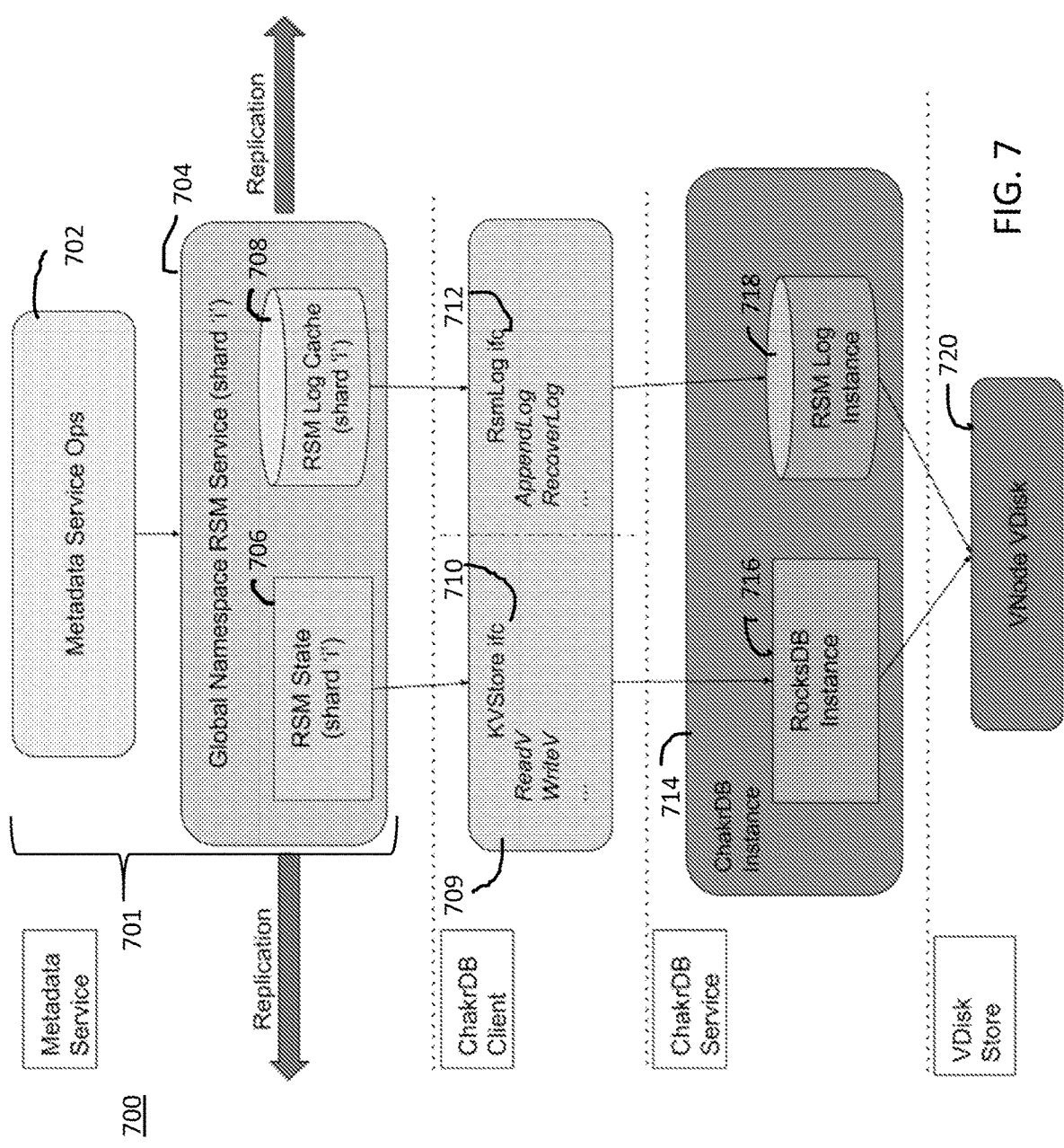
FIG. 7 is a block diagram of a metadata server (MS) instance, in accordance with some embodiments.

FIG. 7 is a block diagram of an MS instance 700, in accordance with some embodiments. The MS instance 700 may be one portion of an object store such as one of the object stores 102A, 204A, 302, 402A, 500, and/or 600. The MS instance 700 includes an MS service 701. The MS service 701 includes MS operations (Ops) 702. The MS Ops 702 may be operatively coupled to the global namespace RSM service 704, which may include the global metadata for shard 'i.' The global namespace RSM service 704 may include the RSM state 706 for shard 'i' and the RSM log cache 708 for shard 'i,' each of which may be ephemeral storage.

As shown in FIG. 7, the global namespace RSM service 704 is integrated with the MS service 701, which can be referred to as the application level. In some embodiments, the MS service 701 has control over definition and granularity of the state in RSM and decides where to replicate the state using RSM. In some embodiments, global metadata is bucket-level metadata. The MS service 701 includes a sharding mechanism for bucket-level metadata maps. The sharding mechanism can guarantee that all bucket metadata belonging to a single shard is handled by a single MS (metadata service) instance. The sharding mechanism can guarantee that RSM state for a given shard (e.g., RSM state 706) can be hosted on the MS service 701.

The MS instance 700 includes a key-value store (KVS) client 709. The KVS client 709 may be a distributed NoSQL KVS client such as ChakrDB client. The key-value (KV) store interface 710 and the RSM log interface 712 can be implemented in the KVS client 709. The MS instance 700 includes a KVS instance 714, which exposes the KVS client 709 to the global namespace RSM service 704. The KVS instance 714 may be a distributed NoSQL KVS instance such as ChakrDB instance. The KVS instance 714 includes a KVS instance 716, which exposes the KV store interface 710 to the RSM state 706. The KVS instance 716 may be an embeddable persistent key-value store instance for fast storage such as Rocks dB instance. The KVS instance 714 includes an RSM log instance 718, which exposes the RSM log interface 712 to the RSM log cache 708.

In some embodiments, RSM state is the same as the metadata map that backs the state. Metadata map for global metadata is also going to be hosted by MS. MS can store metadata maps in vnodes (e.g., in KVS instance 714). In some embodiments, the vnodes are hidden from the MS service 701 by a KVS service. The MS service 701 accesses metadata maps stored in vnodes using KVS client 709 and utilities thereof.

In some embodiments, the MS service 701 routes requests through the KVS instance 714. In some embodiments, RSM logs such as the RSM log cache 708 can be collocated with RSM states such as the RSM state 706 inside vnodes. In some embodiments, the MS instance 700 collocates RSM log storage with vnode storage by exposing log storage one or more APIs from the KVS client 709 and/or the KVS instance 714. In some embodiments, the KVS instance 714 adds functionality such as atomicity or synchronization with metadata maps.

The MS instance 700 includes a vnode virtual disk (vdisk) 720, which is part of a vdisk store. The MS instance 700 persistently stores its metadata maps in the vnode vdisk 720.

Figure 8:
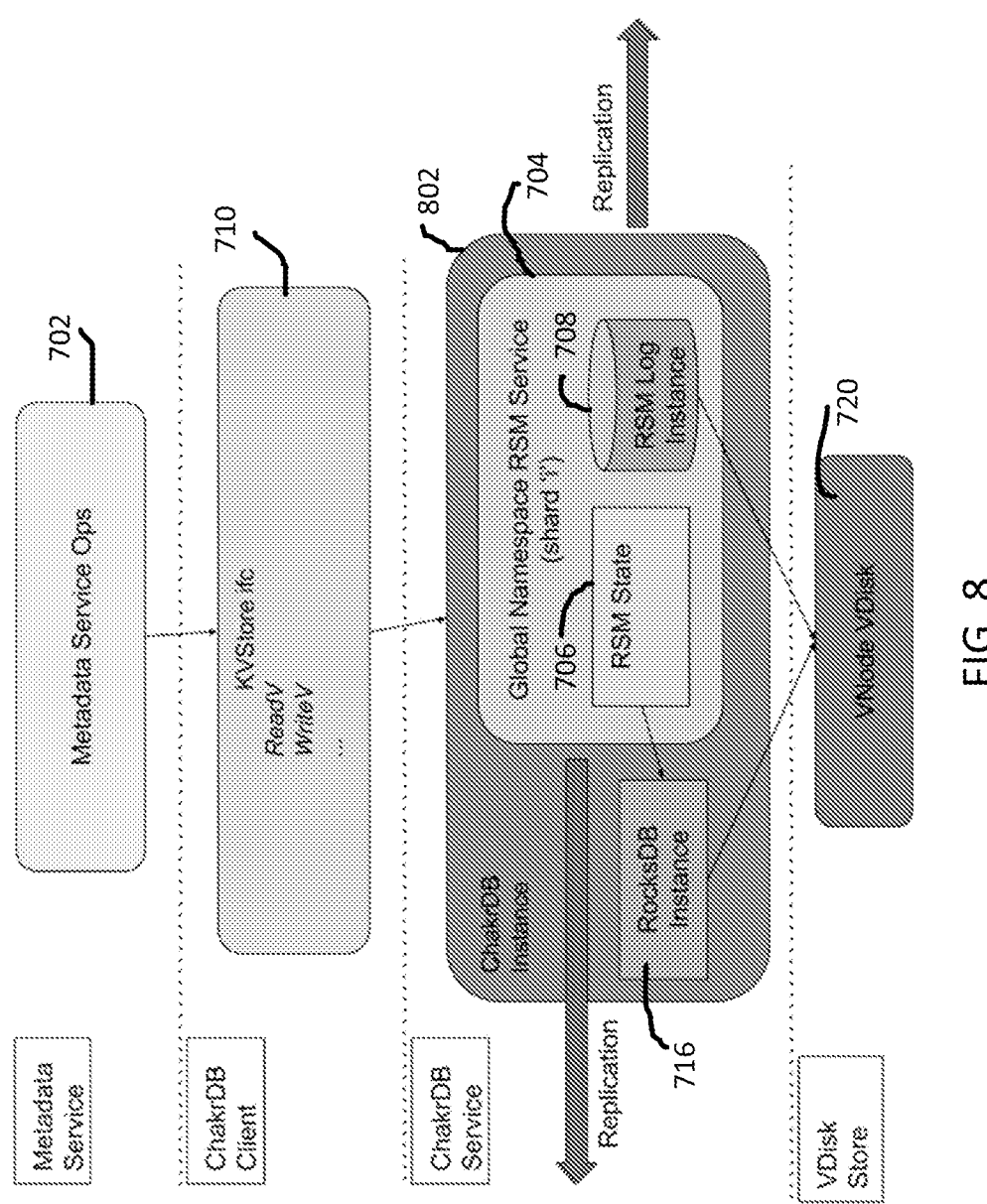
FIG. 8 is a block diagram of an MS instance, in accordance with some embodiments.

FIG. 8 is a block diagram of an MS instance 800, in accordance with some embodiments. The MS instance 800 is similar to the MS instance 700 except that, in the MS instance 800, the global namespace RSM service 704 run in a KVS instance 802. The KVS instance 802 may be similar to the KVS instance 714 of FIG. 7. In some embodiments, the RSM replication is to be done at vnode level (e.g., the key-value store level, the storage level).

Figure 9:
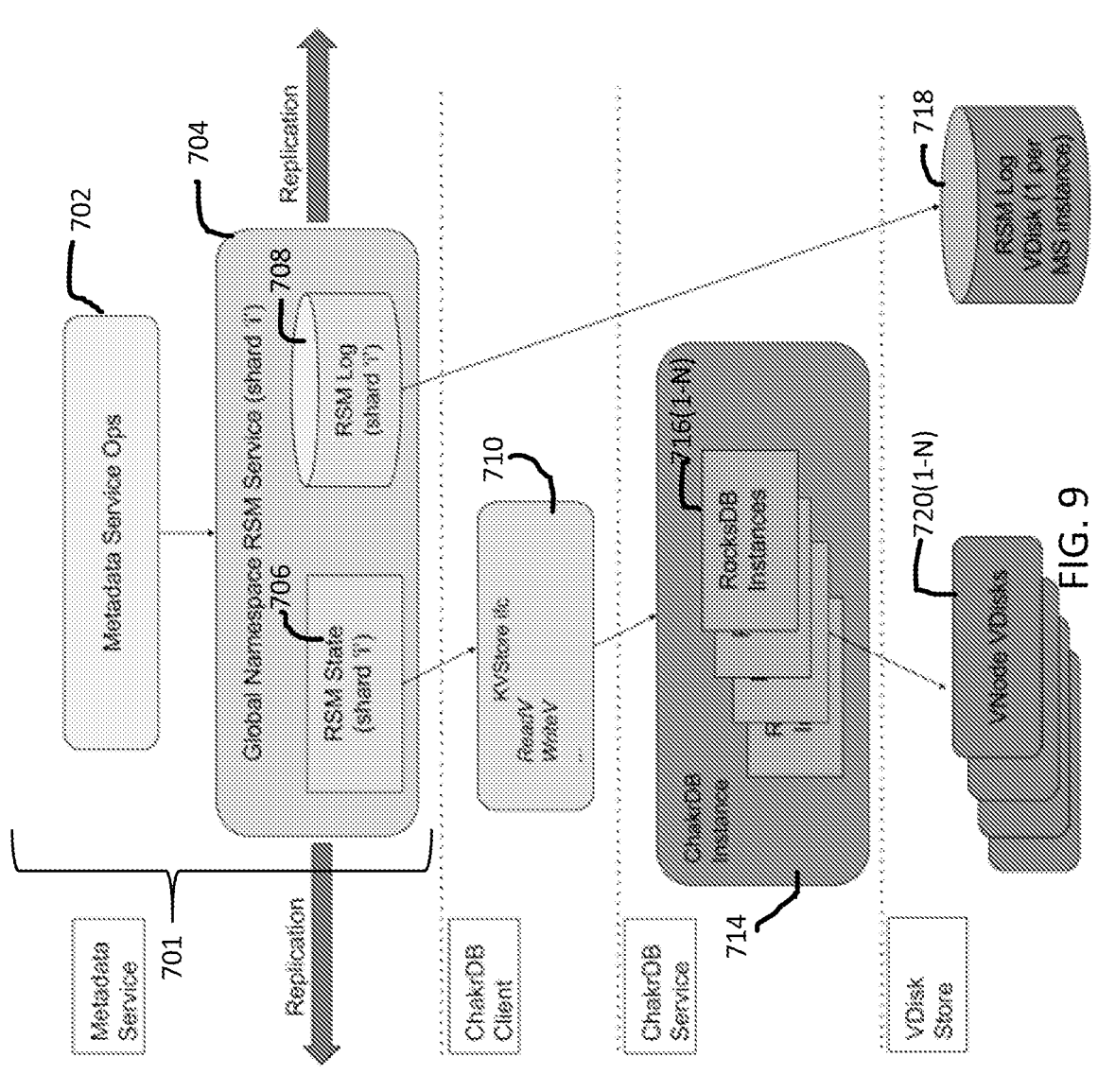
FIG. 9 is a block diagram of an MS instance, in accordance with some embodiments.

FIG. 9 is a block diagram of an MS instance 900, in accordance with some embodiments. The MS instance 900 is similar to the MS instance 700 except that the MS instance 900 illustrates multiple KVM instances 716(1), 716(2), . . . 716(N) and multiple vnode vdisks 720(1), 720(2), . . . 720(N). In some embodiments, each KVM instance of 716(1-N) maps to a corresponding vnode vdisk 720(1-N). For example, the KVM instance 716(1) maps to the vnode vdisk 720(1). In some embodiments, a separate vnode vdisk 720 is attached per MS instance and is shared across the global namespace service instances (1 per metadata shard) running on that MS instance.

Referring now to FIG. 10, a flowchart of an example method 1000 operating an object store federation is illustrated, in accordance with some embodiments of the present disclosure. The method 400 may be implemented using, or performed by, one or more of the systems (e.g., the object store federations, object stores, or MS instances 100-900), one or more components (e.g., the federation service 106, the federation service 202, the global metadata service 304, the global namespace RSM service 504, the global namespace RSM service 704, etc.) of one or more of the systems, a processor associated with one or more of the systems, or a processor of the one or more components of the one or more of the systems. Additional, fewer, or different operations may be performed in the method 1000 depending on the embodiment. Additionally, or alternatively, two or more of the blocks of the method 1000 may be performed in parallel.

At operation 1005, a processor (e.g., a processor associated with the federation service 106, the federation service 202, the global metadata service 304, the global namespace RSM service 504, or the global namespace RSM service 704) receives a request to create a bucket. The processor may receive the bucket creation request via an object storage adapter. In some embodiments, one or more of the operations 1010-1020 are performed in response to the operation 1005.

At operation 1010, the processor writes, to a first object store, a first mapping that maps an identifier of global metadata to an identifier of a second object store where the bucket is to be created. In some embodiments, the first object store includes a first namespace and a first tenant.

At operation 1015, the processor writes, to the second object store, a second mapping that maps the identifier of global metadata to local metadata. In some embodiments, the second object store includes the first name space and/or the first tenant. In some embodiments, the second object store includes a second name space different from the first name space. In some embodiments, the second object store incudes a second tenant different from the first tenant.

At operation 1020, the processor replicates, to the second object store, the first mapping. In some embodiments, the processor replicates the first mapping using a consensus protocol. In some embodiments, the first mapping is replicated at an application level. That is, the processor may correspond to a metadata service (e.g., the metadata service 701). In some embodiments, the first mapping is replicated at a virtual node level. That is, the processor may correspond to a virtual node (e.g., the KVS instance 714).

In some embodiments, the processor receives a request to provide a list of buckets that are created within the first object store or the second object store. In some embodiments, the processor spawns remote procedure calls to each of the first object store and the second object store to provide a list of buckets of the respective object store. In some embodiments, the processor can list buckets one shard at a time and keep track of a continuation token once a page size is exhausted.

It is to be understood that any examples used herein are simply for purposes of explanation and are not intended to be limiting in any way.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents

What is claimed is:

1. An apparatus comprising a processor and a memory, the memory having programmed instructions that, when executed by the processor, cause the apparatus to:

receive a request to create a bucket in an object store federation including a plurality of object stores including a first object store and a second object store; and in response to receiving the request to create the bucket:

create global metadata for the bucket to be created, wherein the global metadata is part of a global namespace for the object store federation;

write, to the first object store, a first mapping that maps the global metadata to the second object store where the bucket is to be created, wherein the first object store includes a first local namespace and the second object store includes a second local namespace;

create the bucket in the second object store;

create local metadata of the bucket in the second object store, wherein the local metadata is part of the local namespace of the second object store;

write, to the second object store, a second mapping that maps the global metadata to the local metadata;

replicate, to the second object store, the first mapping of the global metadata to the second object store; and update the global metadata to indicate that the bucket is created in the second object store.

2. The apparatus of claim 1, the memory having the programmed instructions that, when executed by the processor, further cause the apparatus to:

receive a request to provide a list of buckets that are created within the first object store or the second object store; and spawn remote procedure calls to each of the first object store and the second object store to provide a list of buckets of the respective object store.

3. The apparatus of claim 1, wherein the first mapping is replicated using a consensus protocol.

4. The apparatus of claim 1, wherein the first mapping is replicated at an application level or a virtual node level.

5. The apparatus of claim 1, wherein the first object store includes a first tenant and the second object store includes a second tenant.

6. A non-transitory computer readable storage medium comprising instructions stored thereon that, when executed by a processor, cause the processor to:

receive a request to create a bucket in an object store federation including a plurality of object stores including a first object store and a second object store; and in response to receiving the request to create the bucket:

create global metadata for the bucket to be created, wherein the global metadata is part of a global namespace for the object store federation;

write, to the first object store, a first mapping that maps an identifier of global metadata to the second object store where the bucket is to be created, wherein the first object store includes a first local namespace and the second object store includes a second local namespace;

create the bucket in the second object store;

create local metadata of the bucket in the second object store, wherein the local metadata is part of the local namespace of the second object store;

write, to the second object store, a second mapping that maps the identifier of global metadata to local metadata;

replicate, to the second object store, the first mapping of the global metadata to the second object store; and update the global metadata to indicate that the bucket is created in the second object store.

7. The non-transitory computer readable storage medium of claim 6, comprising the instructions that, when executed by the processor, further cause the processor to:

receive a request to provide a list of buckets that are created within the first object store or the second object store; and spawn remote procedure calls to each of the first object store and the second object store to provide a list of buckets of the respective object store.

8. The non-transitory computer readable storage medium of claim 6, wherein the first mapping is replicated using a consensus protocol.

9. The non-transitory computer readable storage medium of claim 6, wherein the first mapping is replicated at an application level or a virtual node level.

10. The non-transitory computer readable storage medium of claim 6, wherein the first object store includes a first tenant and the second object store includes a second tenant.

11. A computer-implemented method comprising:

receiving, by a processor, a request to create a bucket in an object store federation including a plurality of object stores including a first object store and a second object store; and in response to receiving the request to create the bucket:

creating, by the processor, global metadata for the bucket to be created, wherein the global metadata is part of a global namespace for the object store federation;

writing, by the processor, to the first object store, a first mapping that maps the global metadata to the second object store where the bucket is to be created, wherein the first object store includes a first local namespace and the second object store includes a second local namespace;

creating, by the processor, the bucket in the second object store;

creating, by the processor, local metadata of the bucket in the second object store, wherein the local metadata is part of the local namespace of the second object store;

writing, by the processor, to the second object store, a second mapping that maps the identifier of global metadata to local metadata;

replicating, by the processor, to the second object store, the first mapping of the global metadata to the second object store; and updating, by the processor, the global metadata to indicate that the bucket is created in the second object store.

12. The computer-implemented method of claim 11, further comprising:

receiving, by the processor, a request to provide a list of buckets that are created within the first object store or the second object store; and spawning, by the processor, remote procedure calls to each of the first object store and the second object store to provide a list of buckets of the respective object store.

13. The computer-implemented method of claim 11, wherein the first mapping is replicated using a consensus protocol.

14. The computer-implemented method of claim 11, wherein the first mapping is replicated at an application level or a virtual node level.

15. The apparatus of claim 3, wherein the instructions cause the apparatus to write the first mapping to a set of object stores using the consensus protocol, wherein the set of object stores comprises core members that run a distributed consensus service to provide fault tolerance.

16. The non-transitory computer readable storage medium of claim 8, wherein the instructions cause the processor to write the first mapping to a set of object stores using the consensus protocol, wherein the set of object stores comprises core members that run a distributed consensus service to provide fault tolerance.

17. The computer-implemented method of claim 13, further comprising replicating the first mapping to a set of object stores using the consensus protocol, wherein the set of object stores comprises core members that run a distributed consensus service to provide fault tolerance.

* * * * *